(12) United States Patent
George

(10) Patent No.: US 11,085,225 B2
(45) Date of Patent: Aug. 10, 2021

(54) METHOD OF SCISSOR DOOR WINDOW OPERATION

(71) Applicant: KARMA AUTOMOTIVE LLC, Irvine, CA (US)

(72) Inventor: Todd Maurice George, Irvine, CA (US)

(73) Assignee: KARMA AUTOMOTIVE LLC, Irvine, CA (US)

( * ) Notice: Subject to any disclaimer, the term of this patent is extended or adjusted under 35 U.S.C. 154(b) by 22 days.

(21) Appl. No.: 16/526,600

(22) Filed: Jul. 30, 2019

(65) Prior Publication Data

US 2021/0032924 A1 Feb. 4, 2021

(51) Int. Cl.
*E05F 15/00* (2015.01)
*E05F 15/73* (2015.01)
*B60J 5/04* (2006.01)
*B60J 1/17* (2006.01)

(52) U.S. Cl.
CPC ............ *E05F 15/73* (2015.01); *B60J 1/17* (2013.01); *B60J 5/0472* (2013.01); *E05Y 2900/531* (2013.01); *E05Y 2900/55* (2013.01)

(58) Field of Classification Search
CPC ....... E05F 15/605; E05F 15/70; E05F 15/695; E05F 15/41; E05F 15/00; E05F 15/608; E05F 15/611; B60J 1/17; B60J 5/047; B60J 5/0472; E05Y 2900/531; E05Y 2900/55; E05Y 2900/53; E05D 3/10; E05D 15/00; E05D 3/08; E05D 15/02
USPC ............ 49/31, 232; 296/146.11, 146.12, 202
See application file for complete search history.

(56) References Cited

U.S. PATENT DOCUMENTS

| 6,676,193 B1 * | 1/2004 | Hanagan ................ B60J 5/0472 296/146.11 |
| 6,734,648 B2 * | 5/2004 | Fukumura ............... E05B 81/20 318/468 |
| 6,820,918 B1 * | 11/2004 | DeBono ................. B60J 5/0472 16/289 |

(Continued)

FOREIGN PATENT DOCUMENTS

| JP | 2014-101627 A | 6/2014 |
| JP | 2018-066204 A | 4/2018 |

(Continued)

OTHER PUBLICATIONS

International Search Report and Written Opinion dated Oct. 13, 2020 issued in a related International Patent Application No. PCT/US2020/044295; filed Jul. 30, 2020.

*Primary Examiner* — Chi Q Nguyen
(74) *Attorney, Agent, or Firm* — Gordon Rees Scully Mansukhani, LLP

(57) ABSTRACT

A system for controlling the operation of a window installed in a door of a vehicle, comprising a control module, a vehicle door configured to move upwardly from a closed position to a fully open position, a window configured to move between a first up position and a second down position in which the window is stored in the vehicle door, and a mechanism to move the window between the first up position and the second down position. The control module is configured to direct the mechanism to move the window into the second down position when the control module has received a signal indicating that action has been taken to move the vehicle door towards the fully open position.

18 Claims, 4 Drawing Sheets

(56) References Cited

U.S. PATENT DOCUMENTS

| | | | | |
|---|---|---|---|---|
| 7,007,346 | B2* | 3/2006 | Hoffman | B60J 5/0472 16/294 |
| 7,048,322 | B2* | 5/2006 | DeBono | B60J 5/0472 16/289 |
| 7,503,618 | B2* | 3/2009 | Geyrhofer | B60J 5/0472 296/146.11 |
| 7,770,960 | B2* | 8/2010 | Greenbank | B60J 5/0472 296/146.12 |
| 8,870,260 | B2* | 10/2014 | Le Due | B60J 5/0419 296/146.11 |
| 10,065,569 | B2* | 9/2018 | O'Neill | B60R 11/00 |
| 10,100,562 | B2* | 10/2018 | Seo | E05B 81/34 |
| 10,293,667 | B2* | 5/2019 | Gagas | B60J 5/0487 |
| 10,619,391 | B2* | 4/2020 | Yoo | E05D 5/0207 |
| 2008/0047199 | A1* | 2/2008 | Pribisic | E05F 15/70 49/31 |
| 2009/0134662 | A1* | 5/2009 | Gojcaj | B60J 5/0472 296/146.11 |
| 2010/0276966 | A1* | 11/2010 | Gojcaj | B60J 5/0472 296/146.11 |
| 2013/0099524 | A1* | 4/2013 | Brown | E05F 15/605 296/146.9 |
| 2013/0134738 | A1* | 5/2013 | Le Due | B60J 5/0484 296/146.11 |
| 2014/0259928 | A1* | 9/2014 | Morris | E05F 15/79 49/29 |
| 2016/0222711 | A1* | 8/2016 | Aoshima | E05F 15/695 |
| 2017/0043649 | A1* | 2/2017 | Heirtzler | B60J 1/17 |
| 2017/0260795 | A1* | 9/2017 | Jergess | B60R 16/03 |
| 2017/0273786 | A1* | 9/2017 | Weber | A61F 2/2418 |
| 2017/0342760 | A1* | 11/2017 | Be | E05F 15/70 |
| 2018/0283079 | A1* | 10/2018 | Ting | E05F 15/73 |
| 2020/0308894 | A1* | 10/2020 | Trask | E05F 15/73 |

FOREIGN PATENT DOCUMENTS

| | | |
|---|---|---|
| KR | 10-2011-0112592 A | 10/2011 |
| KR | 10-2018-0026969 A | 3/2018 |

* cited by examiner a window control system for controlling the operation of a window installed in a door of a vehicle.

METHOD OF SCISSOR DOOR WINDOW OPERATION

CROSS-REFERENCE TO RELATED APPLICATIONS

The present application is related to U.S. patent application Ser. No. 16/376,991 filed on Apr. 5, 2019. The foregoing utility application is incorporated by reference herein in its entirety.

BACKGROUND

The present disclosure relates to a system for controlling the operation of a window installed in a door of a vehicle, especially a scissor door of a vehicle.

The use of scissor doors and other doors that open vertically for vehicles has allowed for the design of vehicles with special clearance requirements, especially vehicles that would require an exceptional amount of horizontal space for doors that open horizontally. However, scissor doors and similar vehicle doors introduce a new clearance problem—when the vehicle door is in its open and vertical position, it may require more vertical clearance space than is available in many low roof structures. Often, this vertical clearance issue is exacerbated by a window associated with the vertically opening door, wherein the window adds an extra few inches to the open door's vertical profile. Depending on the design of the window, it may be possible to roll down the window to gain the extra vertical clearance needed, but leaving this to the judgment of a vehicle occupant risks the occupant opening the door but forgetting to roll down the window. In this scenario, it may be possible for the occupant to damage the window, door, or roof by opening the door without rolling down the window.

It is desirable to find a system for controlling the operation of a window installed in a door of a vehicle, wherein controlling includes lowering the window when the door opens.

SUMMARY

Disclosed herein is a system for controlling the operation of a window installed in a door of a vehicle. In one embodiment, the system comprises a control module, a vehicle door configured to move upwardly from a closed position to a fully open position, a window configured to move between a first up position and a second down position in which the window is stored in the vehicle door, and a mechanism to move the window between the first up position and the second down position. In one embodiment, the control module is configured to direct the mechanism to move the window into the second down position when the control module has received a signal indicating that action has been taken to move the vehicle door towards the fully open position. In one embodiment, the vehicle door is a scissor door. In one embodiment, the vehicle door is configured to move by means of a multi-axis hinge.

In another embodiment, the system includes a window sensor that detects the position of the window and provides a window signal to the control module that is representative of the position of the window. In another embodiment, the control module directs the mechanism to move the window into the second down position when the position of the window is indicated to be a predetermined amount away from the second down position. In another embodiment, the control module directs the mechanism to move the window into the second down position when the position of the vehicle door is indicated to be a predetermined amount away from the closed condition.

In another embodiment, wherein the system operates to reduce the vertical profile of the vehicle door when the vehicle door is in an open position.

In another embodiment, the control module is configured to direct the mechanism to move the window into the first up position when the control module has received a signal indicating that action has been taken to move the vehicle door towards the closed position.

Other aspects, features, and techniques will be apparent to one skilled in the relevant art in view of the following detailed description of the embodiments.

BRIEF DESCRIPTION OF THE DRAWINGS

The features, objects, and advantages of the disclosed embodiments will become more apparent from the detailed description set forth below when taken in conjunction with the drawings in which like reference characters identify correspondingly throughout and wherein.

DETAILED DESCRIPTION

One aspect of the disclosure is directed to a window control system for controlling the operation of a window installed in a door of a vehicle.

References throughout this document to "one embodiment," "certain embodiments," "an embodiment," or similar term mean that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. For example, two or more of the innovative systems described herein may be combined in a single system, but the application is not limited to the specific exemplary combinations of systems that are described herein.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

A detailed description of various embodiments is provided; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the disclosed embodiments.

Figure 1:
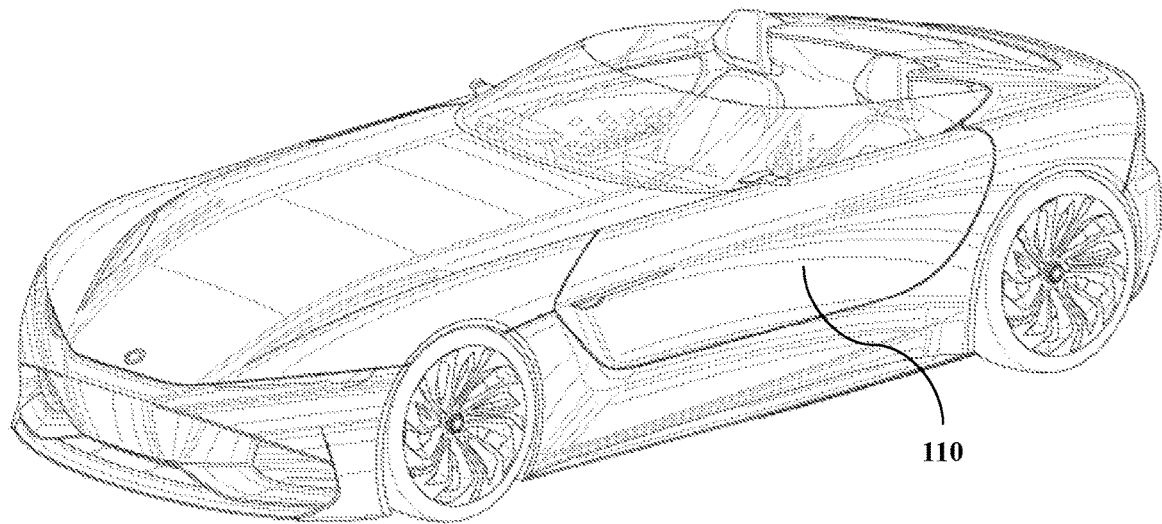
FIG. 1 is a perspective view of an exemplary embodiment of a vehicle in which a window control system may be installed.

FIG. 1 is a perspective view of an exemplary embodiment of a vehicle 100 in which a window control system 200 may be installed. The vehicle 100 depicted in FIG. 1 is exemplary; the window control system 200 described in this document may be used with any vehicle in need of a system for controlling the operation of a window installed in a door of a vehicle.

Figure 2A:
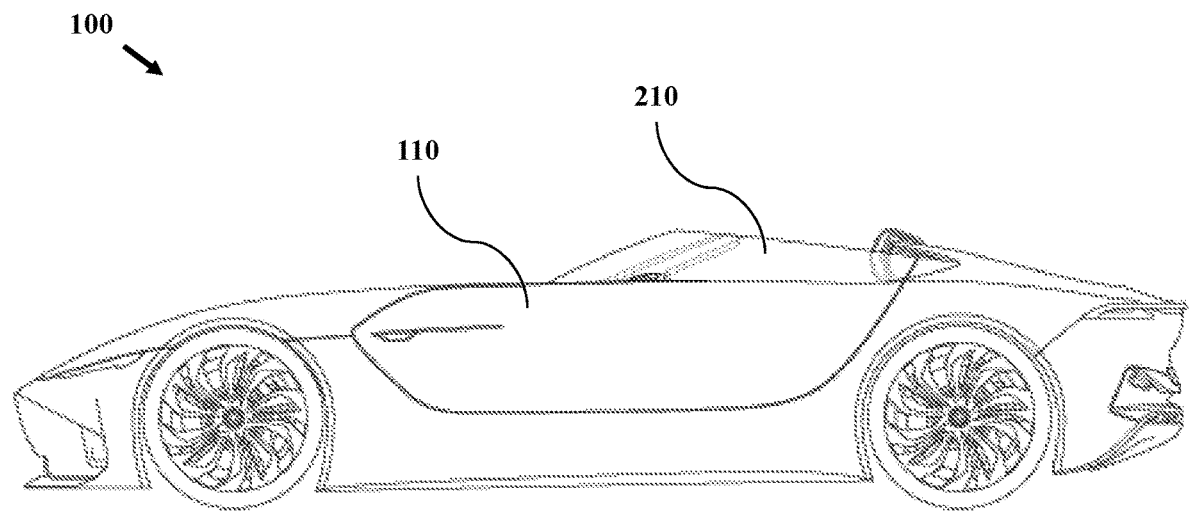
FIG. 2A is a side view of an exemplary embodiment of a vehicle door with a window operated by a window control system, wherein the vehicle door is in a closed position and the window is in a first up position.

FIG. 2A is a side view of an exemplary embodiment of a vehicle door 110 with a window 210 operated by a window control system 200, wherein the vehicle door 110 is in a closed position and the window 210 is in a first up position. In one embodiment, the vehicle door 110 may be a scissor door.

Figure 2B:
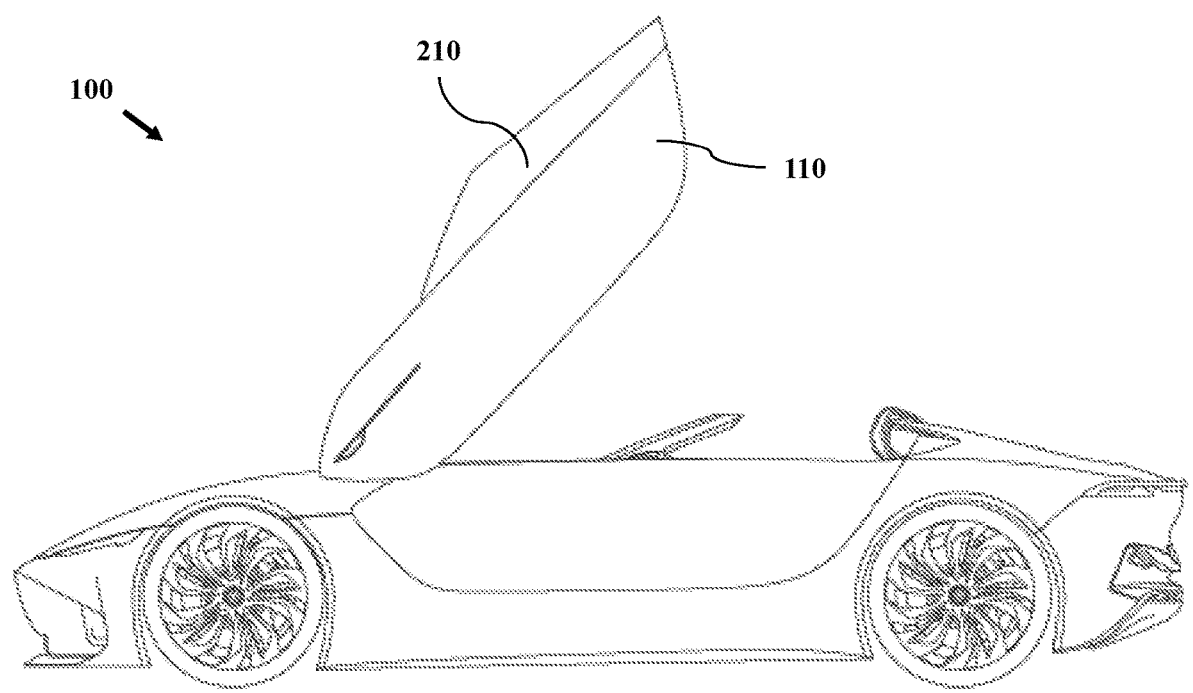
FIG. 2B is a side view of the vehicle door of FIG. 2A, wherein the vehicle door is in a fully open position and the window is in the first up position.

FIG. 2B is a side view of the vehicle door 110 of FIG. 2A, wherein the vehicle door 110 is in a fully open position and the window 210 is in the first up position. In one embodiment, the vehicle door 110 is configured to move upwardly from the closed position to a fully open position. In one embodiment, at any point while the vehicle door 110 is in motion between the closed position and the fully open position, the vehicle door 110 may stop at a position between the closed position and the fully open position. In one embodiment, the vehicle door 110 moves by means of a multi-axis hinge such as the multi-axis hinge disclosed in U.S. patent application Ser. No. 16/376,991.

Figure 2C:
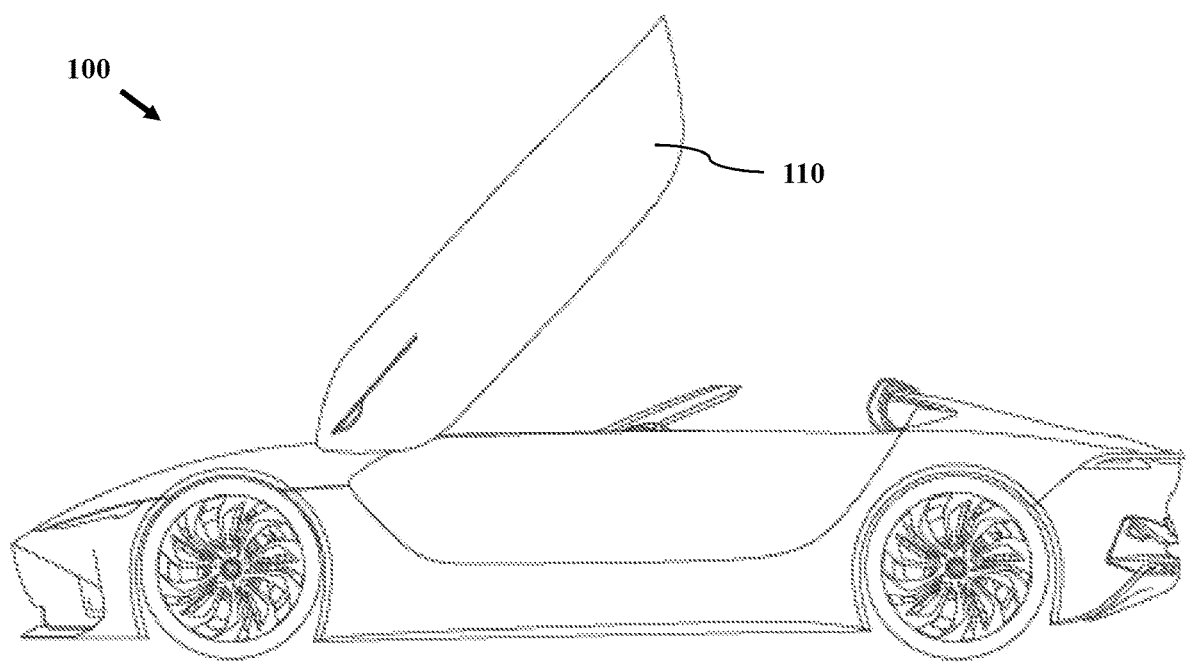
FIG. 2C is a side view of the vehicle door of FIG. 2A, wherein the vehicle door is in a fully open position and the window is in a second down position.

FIG. 2C is a side view of the vehicle door 110 of FIG. 2A, wherein the vehicle door 110 is in a fully open position and the window 210 is in a second down position. In one embodiment, the window 210 is configured to move between the first up position and the second down position. In one embodiment, the second down position is a position in which the window 210 is stored in the vehicle door 110. In one embodiment, while the window 210 is stored in the vehicle door 110, the window 210 is out of sight of any observers of the vehicle 100 or occupants of the vehicle 100. In one embodiment, at any point while the window 210 is in motion between the first up position and a second down position, the window 210 may stop at a position between the first up position and the second down position. In one embodiment, the window 210 may move by means of a mechanism 230 (see FIG. 3) of the window control system 200.

Figure 2D:
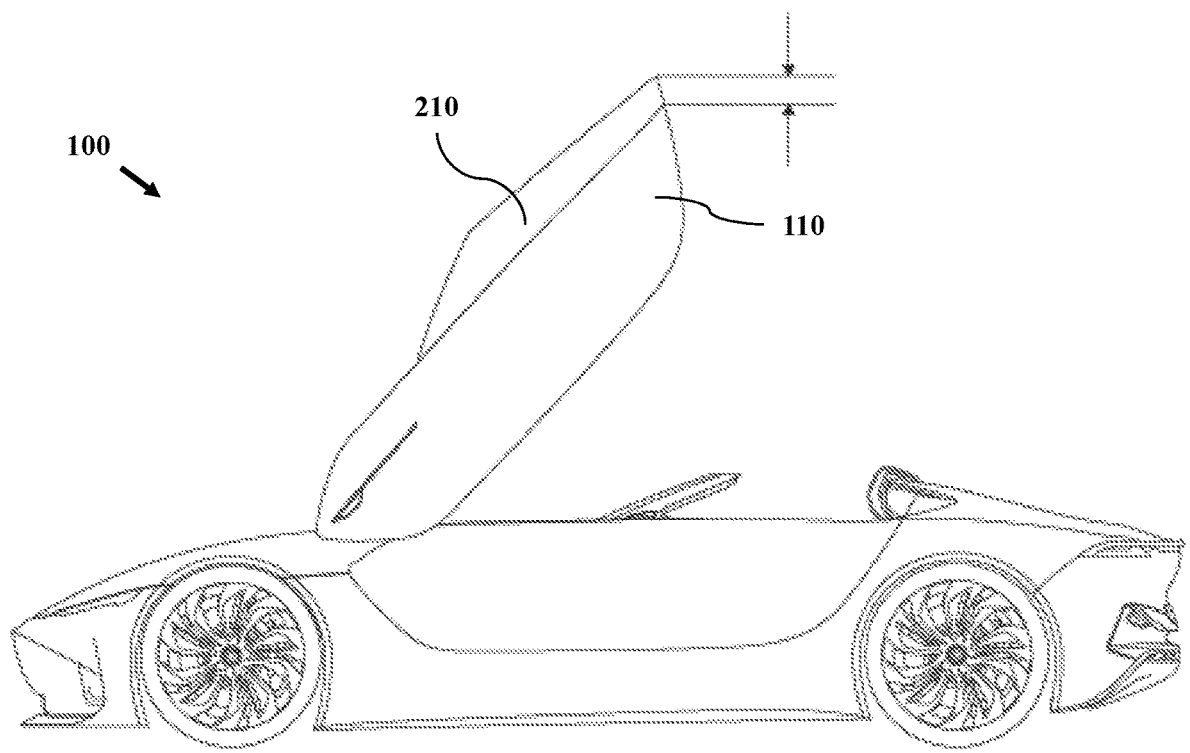
FIG. 2D is a side view of the vehicle door of FIG. 2A highlighting the difference in clearance when the window is in the first up position and when the window is in the second down position, wherein the vehicle door is in the fully open position.

FIG. 2D is a side view of the vehicle door 110 of FIG. 2A highlighting the difference in clearance when the window 210 is in the first up position and when the window 210 is in the second down position, wherein the vehicle door 110 is in the fully open position. In one embodiment, the window control system 200 operates to reduce the vertical profile of the vehicle door 110 when the vehicle door is in an open position or the fully open position. In one embodiment, the window control system 200 operates to reduce the vertical profile of the vehicle door 110 by means of controlling the position of the window 210 between the first up position and the second down position.

Figure 3:
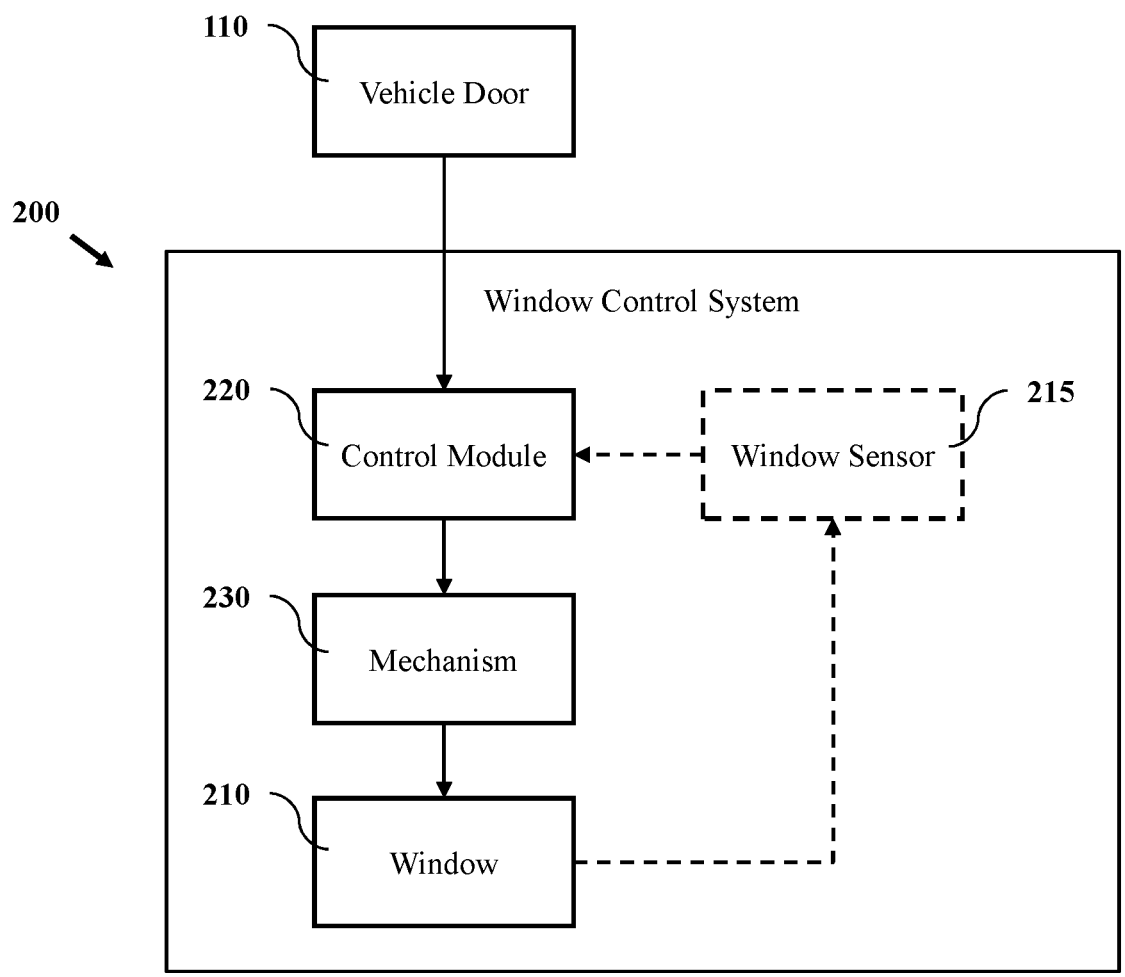
FIG. 3 is a block diagram of an exemplary embodiment of a window control system for controlling the operation of a window installed in a door of a vehicle.

FIG. 3 is a block diagram of an exemplary embodiment of a window control system 200 for controlling the operation of a window 210 installed in a door 210 of a vehicle 100. In one embodiment, the window control system 200 includes a window 210, a control module 220, and a mechanism 230 for moving the window 210. In one embodiment, the control module 220 is configured to receive a signal indicating any actions taken with respect to the vehicle door 110. In one embodiment, when the control module 220 receives a signal indicating that action has been taken to move the vehicle door 110 towards the fully open position, the control module 220 directs the mechanism 230 to move the window 210 into the second down position. In one embodiment, when the control module 220 receives a signal indicating that action has been taken to move the vehicle door 110 towards the closed position, the control module 220 directs the mechanism 230 to move the window 210 into the first up position.

In one embodiment, the window control system 200 includes a window sensor 215 that detects the position of the window 210. In one embodiment, the window sensor 215 provides a window signal to the control module 220 that is representative of the position of the window 210. In one embodiment, when the position of the window 210 is indicated to be a predetermined amount away from the second down position, the control module 220 directs the mechanism 230 to move the window into the second down position. In one embodiment, when the position of the vehicle door 110 is indicated to be a predetermined amount away from the closed position, the control module 220 directs the mechanism 230 to move the window into the second down position.

While this disclosure makes reference to exemplary embodiments, it will be understood by those skilled in the art that various changes in form and details may be made therein without departing from the scope of the claimed embodiments.

What is claimed is:

1. A system for controlling an operation of a window installed in a scissor door of a vehicle, the system comprising:
   a control module;
   a vehicle door configured to move upwardly from a closed position to a fully open position;
   a window configured to move between a first up position and a second down position, wherein in the second down position the window is stored in the vehicle door; and
   a mechanism to move the window between the first up position and the second down position;
   wherein the control module is configured to direct the mechanism to move the window into the second down position when the control module has received a signal indicating that action has been taken to move the vehicle door towards the fully open position.

2. The system of claim 1, wherein the system includes a window sensor that detects a position of the window and provides a window signal to the control module that is representative of the position of the window.

3. The system of claim 2, wherein the control module directs the mechanism to move the window into the second down position when the position of the window is indicated to be a predetermined amount away from the second down position.

4. The system of claim 2, wherein the control module directs the mechanism to move the window into the second down position when the position of the vehicle door is indicated to be a predetermined amount away from the closed condition.

5. The system of claim 1, wherein the system operates to reduce a vertical profile of the vehicle door when the vehicle door is in an open position.

6. The system of claim 1, wherein the control module is configured to direct the mechanism to move the window into the first up position when the control module has received a signal indicating that action has been taken to move the vehicle door towards the closed position.

7. A system for controlling an operation of a window installed in a door of a vehicle, the system comprising:
   a control module;
   a vehicle door configured to move upwardly from a closed position to a fully open position;
   a window configured to move between a first up position and a second down position, wherein in the second down position the window is stored in the vehicle door; and
   a mechanism to move the window between the first up position and the second down position;
   wherein the control module is configured to direct the mechanism to move the window into the second down position when the control module has received a signal indicating that action has been taken to move the vehicle door towards the fully open position.

8. The system of claim 7, wherein the system includes a window sensor that detects a position of the window and provides a window signal to the control module that is representative of the position of the window.

9. The system of claim 8, wherein the control module directs the mechanism to move the window into the second down position when the position of the window is indicated to be a predetermined amount away from the second down position.

10. The system of claim 8, wherein the control module directs the mechanism to move the window into the second down position when the position of the vehicle door is indicated to be a predetermined amount away from the closed condition.

11. The system of claim 7, wherein the system operates to reduce a vertical profile of the vehicle door when the vehicle door is in an open position.

12. The system of claim 7, wherein the control module is configured to direct the mechanism to move the window into the first up position when the control module has received a signal indicating that action has been taken to move the vehicle door towards the closed position.

13. A system for controlling an operation of a window installed in a door of a vehicle, the system comprising:
   a control module;
   a vehicle door configured to move upwardly from a closed position to a fully open position by means of a multi-axis hinge;
   a window configured to move between a first up position and a second down position, wherein in the second down position the window is stored in the vehicle door; and
   a mechanism to move the window between the first up position and the second down position;
   wherein the control module is configured to direct the mechanism to move the window into the second down position when the control module has received a signal indicating that action has been taken to move the vehicle door towards the fully open position.

14. The system of claim 13, wherein the system includes a window sensor that detects a position of the window and provides a window signal to the control module that is representative of the position of the window.

15. The system of claim 14, wherein the control module directs the mechanism to move the window into the second down position when the position of the window is indicated to be a predetermined amount away from the second down position.

16. The system of claim 14, wherein the control module directs the mechanism to move the window into the second down position when the position of the vehicle door is indicated to be a predetermined amount away from the closed condition.

17. The system of claim 13, wherein the system operates to reduce a vertical profile of the vehicle door when the vehicle door is in an open position.

18. The system of claim 13, wherein the control module is configured to direct the mechanism to move the window into the first up position when the control module has received a signal indicating that action has been taken to move the vehicle door towards the closed position.

* * * * *